US012193125B2

(12) United States Patent
Selvaraj et al.

(10) Patent No.: US 12,193,125 B2
(45) Date of Patent: Jan. 7, 2025

(54) CONTROLLING BEACONING OF A WIRELESS LIGHTING INTERFACE WITH A LIGHT SOURCE

(71) Applicant: ABL IP HOLDING LLC, Conyers, GA (US)

(72) Inventors: Gomez Sam Selvaraj, Grayson, GA (US); Steven Downs, Lilburn, GA (US); Ryan A. Zaveruha, Trumbull, CT (US)

(73) Assignee: ABL IP HOLDING LLC, Conyers, GA (US)

( * ) Notice: Subject to any disclaimer, the term of this patent is extended or adjusted under 35 U.S.C. 154(b) by 73 days.

(21) Appl. No.: 17/871,300

(22) Filed: Jul. 22, 2022

(65) Prior Publication Data
US 2024/0032176 A1 Jan. 25, 2024

(51) Int. Cl.
H05B 47/11 (2020.01)
H05B 47/19 (2020.01)

(52) U.S. Cl.
CPC ............ H05B 47/11 (2020.01); H05B 47/19 (2020.01)

(58) Field of Classification Search
CPC .... H05B 47/11; H05B 47/19; H05B 47/1965; H05B 47/196; Y02B 20/40
See application file for complete search history.

(56) References Cited

U.S. PATENT DOCUMENTS 6,690,003 B2  2/2004  Zak
8,860,324 B2  10/2014 Barrilleaux et al.
8,981,913 B2  3/2015  Tenig et al.
9,192,019 B2  11/2015 Huizenga et al.
9,572,228 B2  2/2017  Henig et al.
9,747,196 B2  8/2017  Simonyi et al.
9,888,548 B2  2/2018  Huizenga et al.
10,111,308 B2 10/2018 Huizenga et al.
10,143,070 B2 11/2018 Deixler et al.

(Continued)

OTHER PUBLICATIONS

"Using a Green Laser to Program Lutron Ceiling and Wall-Mounted Devices," Lutron, Application Note #407, Revision F, Mar. 2019, 6 Pages (Year: 2019).*

(Continued)

Primary Examiner — Raymond R Chai
(74) Attorney, Agent, or Firm — Buchanan Ingersoll & Rooney PC

(57) ABSTRACT

A lighting system includes a wake-up light source to emit a wake-up light beam and a plurality of luminaires located in a space. A respective luminaire includes an illumination light source to emit illumination lighting for the space, a light sensor to detect light, a wireless transceiver configured for wireless communication, and a memory. The respective luminaire further includes a processor coupled to the light sensor, the wireless transceiver, and the memory. The respective luminaire further includes wake-up programming in the memory. Execution of the wake-up programming by the processor causes the respective luminaire to: (a) detect a plurality of light measurements above a light threshold; (b) determine whether the plurality of light measurements are in accordance with a pattern; and (c) in response to determining the plurality of light measurements are in accordance with the pattern, enter a beaconing mode.

15 Claims, 5 Drawing Sheets

(56) References Cited

U.S. PATENT DOCUMENTS

| | | | |
|---|---|---|---|
| 10,206,269 | B2 | 2/2019 | Wagoner et al. |
| 10,282,978 | B2 | 5/2019 | Cash |
| 10,601,516 | B2 | 3/2020 | Deixler et al. |
| 2006/0202851 | A1 | 9/2006 | Cash et al. |
| 2011/0199004 | A1 | 8/2011 | Henig et al. |
| 2011/0199020 | A1 | 8/2011 | Henig et al. |
| 2012/0200226 | A1* | 8/2012 | Knibbe ............... H05B 47/199 315/151 |
| 2013/0147366 | A1* | 6/2013 | Huizenga ............ H05B 47/10 315/152 |
| 2015/0263861 | A1* | 9/2015 | Kumar ................. H04L 9/32 713/168 |
| 2015/0359069 | A1* | 12/2015 | Tiberi .................. H05B 47/10 315/151 |
| 2017/0150577 | A1 | 5/2017 | Steiner et al. |
| 2018/0084628 | A1* | 3/2018 | Huizenga ............ H05B 47/199 |
| 2019/0045601 | A1* | 2/2019 | Beghelli ............... H05B 47/11 |
| 2020/0288558 | A1 | 9/2020 | Anderson et al. |
| 2021/0051461 | A1 | 2/2021 | Deixler et al. |
| 2021/0105885 | A1* | 4/2021 | Van Den Berg ....... H05B 47/19 |
| 2023/0318915 | A1* | 10/2023 | Anderson ............. H04W 8/005 709/220 |

OTHER PUBLICATIONS

"SensorSwitch™ BTP Sensors New Flashlight Wakeup Feature," AcuityBrands, Copyright © 2022, 3 pages.

"SensorSwitch™ SBG BTP Sensor—New Features," Copyright © 2022, Acuity Brands Lighting, Inc., 5 pages.

"Using a Green Laser to Program Lutron Ceiling and Wall-Mounted Devices," Lutron, Application Note #407, Revision F, Mar. 2019, 6 pages.

Office Action (Examination Report) issued Nov. 4, 2024, by the Canadian Intellectual Property Office in corresponding Canadian Application No. 3,206,822. (4 pages).

* cited by examiner

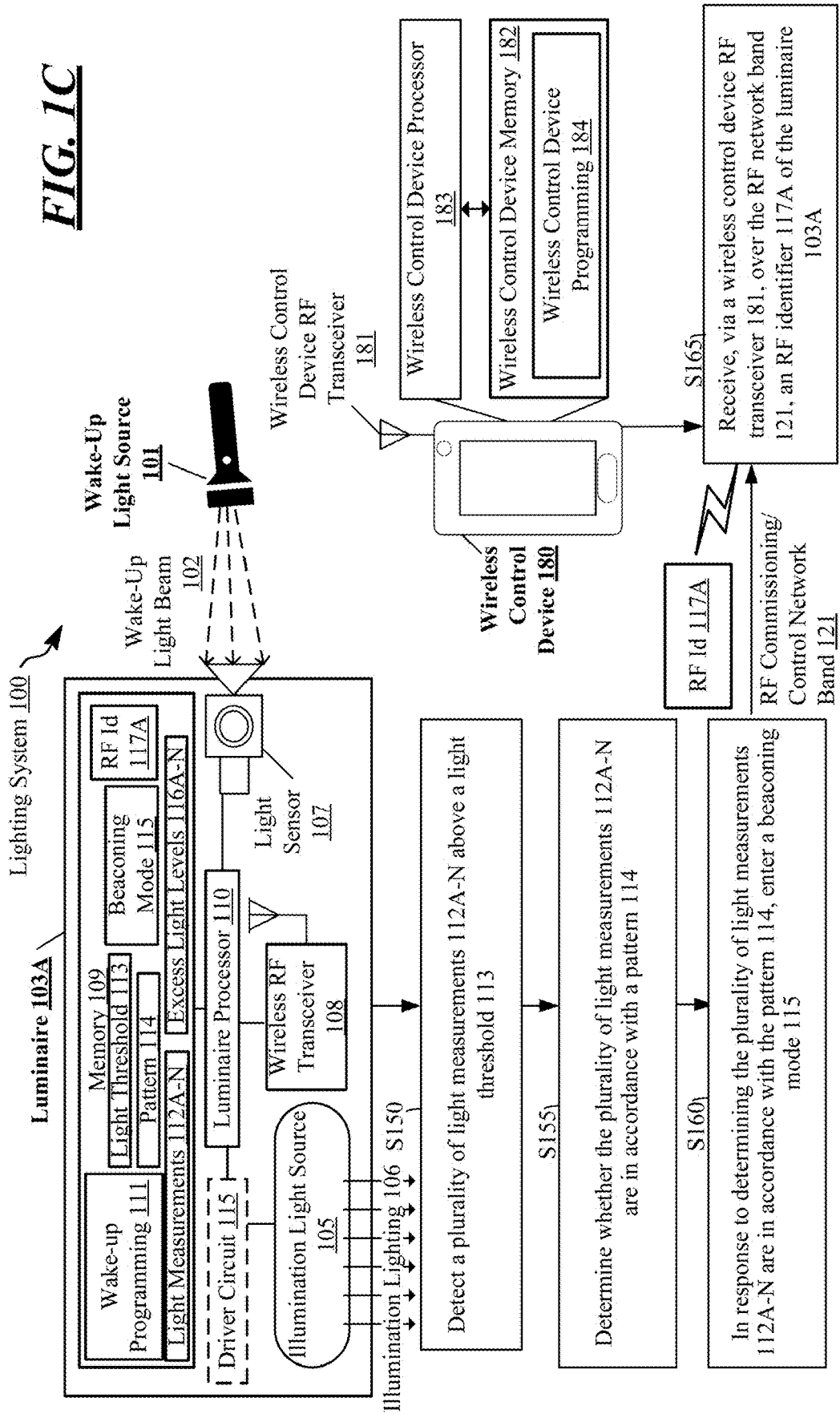

CONTROLLING BEACONING OF A WIRELESS LIGHTING INTERFACE WITH A LIGHT SOURCE

BACKGROUND

One way to enable commissioning and control of a large group of luminaires or multiple groups of luminaires is having the luminaires remain in a wireless beaconing state. During the beaconing state, the luminaire may permanently advertise itself to enable connection to the luminaire at any time. For example, high bay luminaires (e.g., approximately 75,000 Lumens) in a space, such as a warehouse, with sensors must beacon all the time to be in the controllable state. Since there can be hundreds of luminaires in any given space, it's a hassle for a user to identify any specific luminaire without toggling each luminaire until the specific luminaire is found.

Unfortunately, this creates confusion for a user trying to find and configure one specific luminaire. Because other luminaires are all beaconing, the user ends up wasting time trying to identify each luminaire to narrow it down to a specific luminaire. In addition, having all of the luminaires permanently beacon causes issues with other functions of the luminaires that operate in the same frequency band, such as lighting control communications.

Visual light programming (VLP) and laser light programming can be used to address the above noted issues, but are not without challenges. For example, visual light programming uses a light to program/configure luminaire settings. For example, in visual light programming a light (e.g., a cell phone light) is rapidly flashed to provide a preprogrammed modulated signal to a receiver in a luminaire, after which the modulated signal is demodulated by the receiver. Modulation of the visual light programming signal is typically performed with a dedicated graphical user interface (GUI) mobile application, for example, on a mobile device (e.g., smartphone). Moreover, the range of the mobile device is very low and can't reach a 50 feet high bay luminaire. Hence, the challenges of a visible light programming system is that it is too short range and also relies on a high lux on the sensor.

Laser light programming requires pointing a laser pointer at a sensor. Although the laser pointer can cover a long range with its narrow beam, it is hard for a user to visualize and point the laser pointer at a 2-millimeter (mm) hole (e.g., photo sensor lens) on a luminaire sensor located on a 50 feet high ceiling. Moreover, it is difficult for the user to look at the luminaire and point the laser when the sensor is integrated into a luminaire lit at approximately 75,000 lumens. Laser light programming is also expensive and accident prone. Hence, the challenges of laser light programming is that it is a narrow beam and while laser light can travel a long distance, it is pragmatically difficult to point a narrow beam laser at a small sensor from any appreciable distance from the sensor.

A wake-up protocol for beaconing is needed to overcome these and other limitations in the art. The wake-up protocol advantageously enables both long range and ease of use, while also mitigating the challenges associated with using a sensor of higher sensitivity.

SUMMARY

As described herein, the wake-up protocol can utilize a generic flashlight or any other regular light source. Unlike other methods described in prior art, the wake-up protocol does not require any special GUI application or modulated signal. The wake-up protocol can use an irregular wide spectrum light source, non-directional with inconsistent distribution, an in-expensive regular light source, which can be pointed at a high bay luminaire at 50 feet without searching for a tiny hole and the sensor unit itself on the luminaire. Functionally, the wireless communication interface (wireless beacon) on these standalone luminaires can be disabled autonomously after a certain time frame upon power up to keep the space noiseless. The user can re-enable the wireless communication interface of any specific device using a wake-up light source pointing at the light fixture directly without affecting the fixture's light output (due to the sudden light variation) using this wake-up protocol with a specific timing sequence and a light state engine.

BRIEF DESCRIPTION OF THE DRAWINGS

The drawing figures depict one or more implementations in accordance with the present teachings, by way of example only, not by way of limitation. In the figures, like reference numerals refer to the same or similar elements.

FIG. 1C is a wake-up protocol procedure for the lighting system that is implemented by the wake-up light source and a respective luminaire of the plurality of luminaires.

DETAILED DESCRIPTION

Figure 1A:
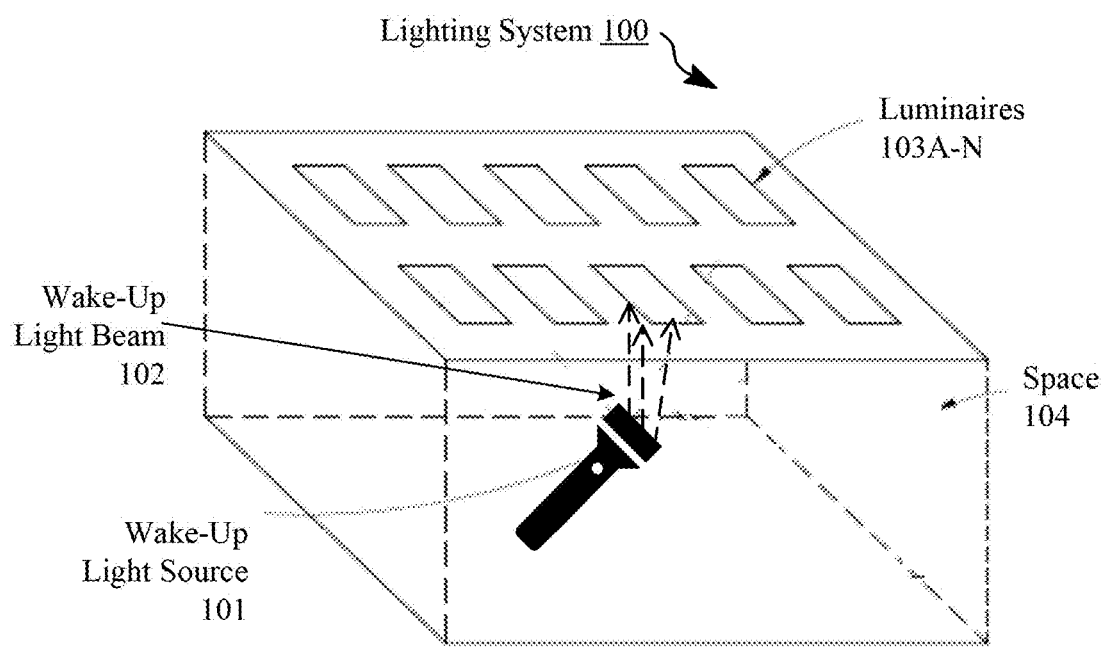
FIG. 1A depicts a lighting system that includes a wake-up light source to emit a wake-up light beam to enable a wireless control ability of a specific luminaire of a plurality of luminaires located in a space.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The term "luminaire," as used herein, is intended to encompass essentially any type of device that processes energy to generate or supply artificial light, for example, for general illumination of a space intended for use of occupancy or observation, typically by a living organism that can take advantage of or be affected in some desired manner by the light emitted from the device. However, a luminaire may provide light for use by automated equipment, such as sensors/monitors, robots, etc. that may occupy or observe the illuminated space, instead of or in addition to light provided for an organism. However, it is also possible that one or more luminaires in or on a particular premises have other lighting purposes, such as signage for an entrance or to indicate an exit. In most examples, the luminaire(s) illuminate a space or area of a premises to a level useful for a human in or passing through the space, e.g., of sufficient intensity for general illumination of a room or corridor in a building or of an outdoor space such as a street, sidewalk, parking lot or performance venue. The actual source of illumination light in or supplying the light for a luminaire may be any type of artificial light emitting device, several examples of which are included in the discussions below.

Terms such as "artificial lighting" or "illumination lighting" as used herein, are intended to encompass essentially any type of lighting that a device produces light by processing of electrical power to generate the light. A luminaire for an artificial lighting or illumination lighting application, for example, may take the form of a lamp, light fixture, or other luminaire arrangement that incorporates a suitable light source, where the lighting device component or source(s) by itself contains no intelligence or communication capability. The illumination light output of an artificial illumination type luminaire, for example, may have an intensity and/or other characteristic(s) that satisfy an industry acceptable performance standard for a general lighting application.

The term "coupled" as used herein refers to any logical, optical, physical or electrical connection, link or the like by which signals or light produced or supplied by one system element are imparted to another coupled element. Unless described otherwise, coupled elements or devices are not necessarily directly connected to one another and may be separated by intermediate components, elements or communication media that may modify, manipulate or carry the light or signals Reference now is made in detail to the examples illustrated in the accompanying drawings and discussed below.

FIG. 1A depicts a lighting system 100 that includes a wake-up light source 101 to emit a wake-up light beam 102 to enable a wireless control ability of a specific luminaire 103A of a plurality of luminaires 103A-N located in a space 104. The wake-up light source 101 can include a generic light source. The plurality of luminaires 103A-N of the lighting system 100 are located in a space 104. Luminaires 103A-N illuminate the space 104 of a premises to a level useful for a human in or passing through the space, e.g. general illumination of an indoor space, such as a warehouse, room, or a corridor in a building; or of an outdoor space such as a street, sidewalk, parking lot or performance venue.

Figure 1B:
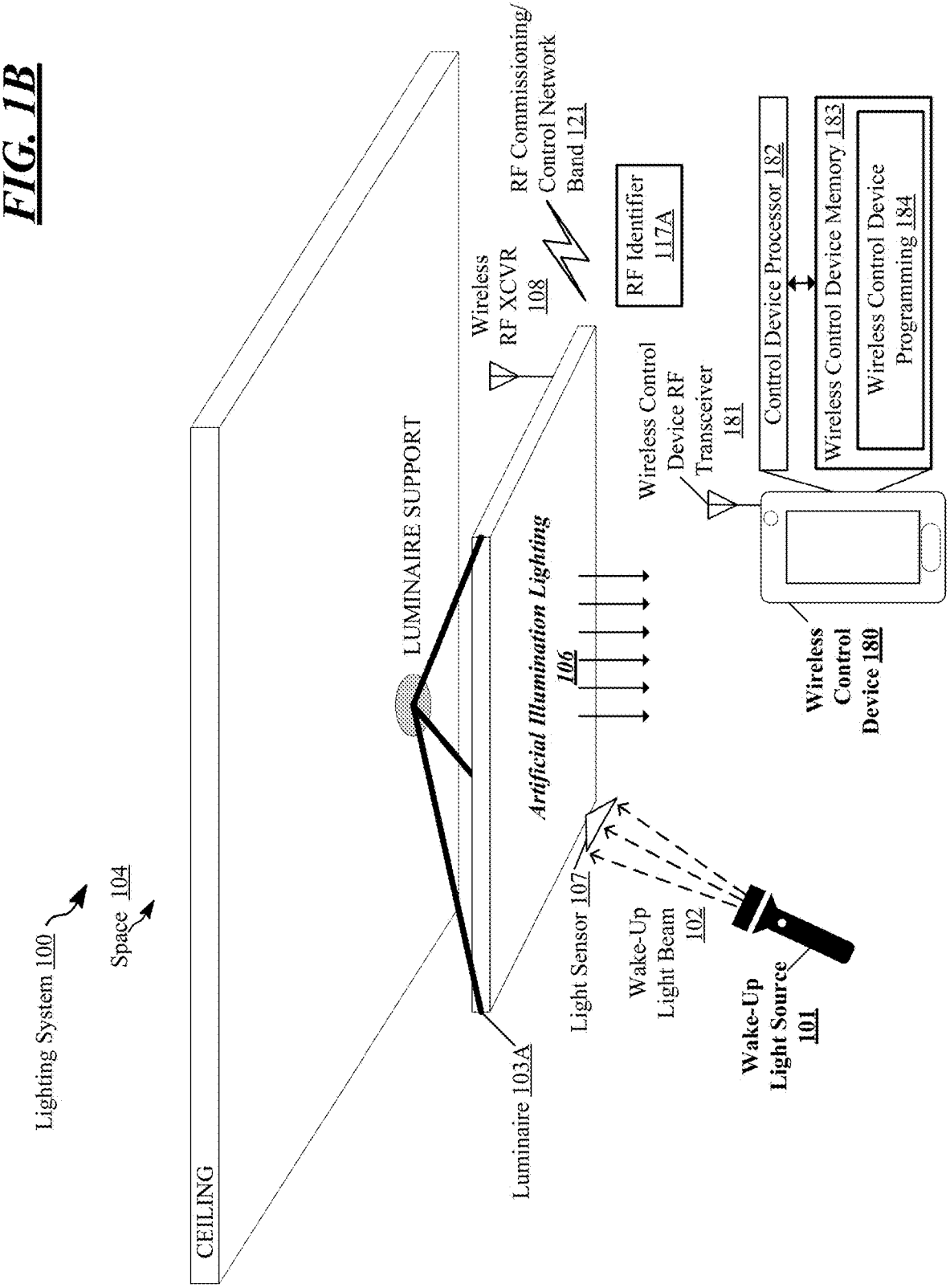
FIG. 1B is an isometric view of the luminaire mounted in the space and in communication with the wake-up light source.

FIG. 1B is an isometric view of the luminaire 103A mounted in the space 104 and in communication with the wake-up light source 101. Wake-up light source 101 can include a diffuse light source like a flashlight to wake up a radio (shown as wireless radio frequency (RF) XCVR 108) of a standalone lighting device (shown as luminaire 103A). Hence, the wake-up light source 101 can cause the luminaire 103A to enter into a programming mode. Although shown as a flashlight, the wake-up light source 101 can be a smartphone flashlight. The wake-up light beam 102 can include incoherent light. Alternatively, the wake-up light source 101 includes a laser light source and the wake-up light beam 102 includes coherent light (e.g., collimated light). Wake-up light beam 102 can be a patterned, low lux (e.g., less than about 100 lux) diffuse light imparted on a light sensor 107 of the luminaire 103A to wake up the radio (wireless RF XCVR 108) of the luminaire 103A, alone or in combination with features that mitigate false tripping of the light sensor 107 of the luminaire 103A.

Upon powerup, a standalone wireless lighting device, such as the luminaire 103A, can open its wireless transceiver 108 to hosts (e.g., wireless control device 180, which can be a smartphone with Bluetooth capability) to communicate by wirelessly beaconing (e.g., advertising) over an RF commissioning and/or control network band 121. For example, the RF commissioning and/or control network band 121 can be at 3 different dedicated channels in the 2,400 MHz spectrum. However, this design limits the wireless beacon duration to a fixed timeout (e.g., 45 minutes), which may not be enough to configure newly installed wireless devices, such as the luminaire 103A because the luminaire 103A will automatically shut off the wireless beaconing upon reaching the fixed timeout. Accordingly, the wake-up protocol 120 (see FIG. 1C) that includes flashing the wake-up light beam 102 from the wake-up light source 101 in a certain sequence of operation and time at the luminaire 103A will enable the wireless transceiver 108 to beacon again for wireless control ability by the wireless control device 180.

In the example of FIGS. 1A-B, the drop light fixture type luminaire 103A is hung below a ceiling of the space 104 by multiple support rods or cables attached to a number of brackets on the luminaire 103A. The example of FIG. 1B represents a pendant type light fixture implementation of the luminaire 103A in which the fixture has a bracket on a surface opposite the artificial illumination lighting output 106, providing an attachment point for a single strut attached to or through the ceiling. Other aspects of structure, orientation and operation of the other luminaires 103B-N is generally similar to the luminaire 103A discussed herein. Location of electronics should be decided (e.g. in ceiling or on fixture) size and weight considerations, since fixture weight may be an issue. For example, the electronics of the lighting device may be in the suspended luminaire portion or included in or near the support structure above the ceiling to reduce the weight held below the ceiling by the support(s) and bracket(s).

FIG. 1C is a wake-up protocol 120 procedure for the lighting system 100 that is implemented by the wake-up light source 101 and a respective luminaire 103A of the plurality of luminaires 103A-N. One significant benefit of the wake-up protocol 120 is that it makes it much easier for a user to identify and configure specific light fixtures (luminaires 103A-N), even from a substantial distance (e.g., greater than 2, 5, 10, 20, or even 30 feet or more). The wake-up protocol 120 can be of particular use for standalone lighting devices—i.e., devices which are not part of (or capable of being part of) a networked (e.g., wirelessly networked) lighting group.

As shown, the respective luminaire 103A includes an illumination light source 105 to emit illumination lighting 106 for the space 104. The respective luminaire 103A further includes a light sensor 107 to detect light. The respective luminaire 103A further includes a wireless transceiver 108 configured for wireless communication. As shown, the wireless transceiver (XCVR) 108 is configured for radio frequency (RF) communication over an RF commissioning and/or control network band 121. The respective luminaire 103A further includes a memory 109; and a processor 110 coupled to the light sensor 107, the wireless transceiver 108, and the memory 109. The respective luminaire 103A further includes wake-up programming 111 in the memory 109 to implement the wake-up protocol 120. After power up, the wireless transceiver 108 is shut off, which keeps the space 104 without any wireless beaconing traffic from luminaires 103A-N. Wake-up protocol 120 provides the user has the ability to enable the wireless transceiver 108 interface on any one luminaire 103A-N they wish to control using the wake-up light source 101.

Beginning in block S150, execution of the wake-up programming 111 by the processor 110 causes the respective luminaire 103A to detect a plurality of light measurements 112A-N above a light threshold 113. In an example, to detect the plurality of light measurements 112A-N above the light threshold 113 includes to: (a) measure, via the light sensor 107, the plurality of light measurements 112A-N; and (b) based on the plurality of light measurements 112A-N, identify a sequence of excess light levels 116A-B. To identify the sequence of excess light levels 116A-N includes to: calibrate the sequence of excess light levels 116A-N based on a previous ambient light level (e.g., first ambient light measurement 112A) of background light in the space 104.

To calibrate the sequence of excess light levels 116A-B further includes to: subtract a contribution of the previous ambient light level (e.g., first ambient light measurement 112A) to a respective light measurement (e.g., second ambient light measurement 112B) to isolate a respective excess light level 116A-B caused by the wake-up light beam 102 from the background light in the space 104.

Moving to block S155, execution of the wake-up programming 111 by the processor 110 causes the respective luminaire 103A to determine whether the plurality of light measurements 112A-N are in accordance with a pattern 114. To determine whether the plurality of light measurements 112A-N are in accordance with the pattern 114 includes to: compare, the sequence of excess light levels 116A-B with a wake-up sequence 300 (see FIG. 3) that includes the light threshold 113; and determine that the comparison of the sequence of excess light levels 116A-B satisfies the wake-up sequence 300 (see FIG. 3). The wake-up sequence 300 further includes a minimum ON cycle time 305 (see FIG. 3). To determine that the comparison of the sequence of excess light levels 116A-B satisfies the wake-up sequence 300 (see FIG. 3) includes to: determine that a respective ON time 315A-B of each of the excess light levels 116A-B satisfies the minimum ON cycle time 305 (see FIG. 3). The wake-up sequence further includes a maximum ON/OFF cycle transition time 325. To determine that the comparison of the sequence of excess light levels 116A-B satisfies the wake-up sequence 300 includes to: determine that a respective ON/OFF transition time 320 between each of the excess light levels 116A-B satisfies the maximum ON/OFF cycle transition time 325.

Continuing in block S160, execution of the wake-up programming by the processor 110 causes the respective luminaire 103A to in response to determining the plurality of light measurements 112A-N are in accordance with the pattern 114, enter a beaconing mode 115. To enter the beaconing mode 115 includes to enable advertising of the wireless transceiver 108 of the respective luminaire 103A. For example, the respective luminaire 103A transmits, via the wireless transceiver 108, an RF identifier (id) 117A of the respective luminaire 103A.

Finishing now in block S165, a wireless control device 180 includes a wireless control device RF transceiver 181 and a wireless control device memory 182. The wireless control device 180 further includes and a wireless control device processor 183 coupled to the wireless control device RF transceiver 181 and the wireless control device memory 182. The wireless control device 180 further includes wireless control device programming 184 in the wireless control device memory 182. Execution of the wireless control device programming 184 causes the wireless control device 180 to receive via the wireless control device RF transceiver 181, over the RF commissioning and/or control network band 121, the RF identifier 117A of the respective luminaire 103A.

In some examples, the wake-up light source 101 can be included in the wireless control device 180, e.g., a cell phone, tablet, etc. can include a flashlight which can be used to wake up the radio (wireless RF XCVR 108) of the luminaire 103A. The wireless control device programming 184 provides a user interface that can interact with the lighting device (luminaire 103A) after the radio (wireless RF XCVR 108) is woken up.

Figure 2:
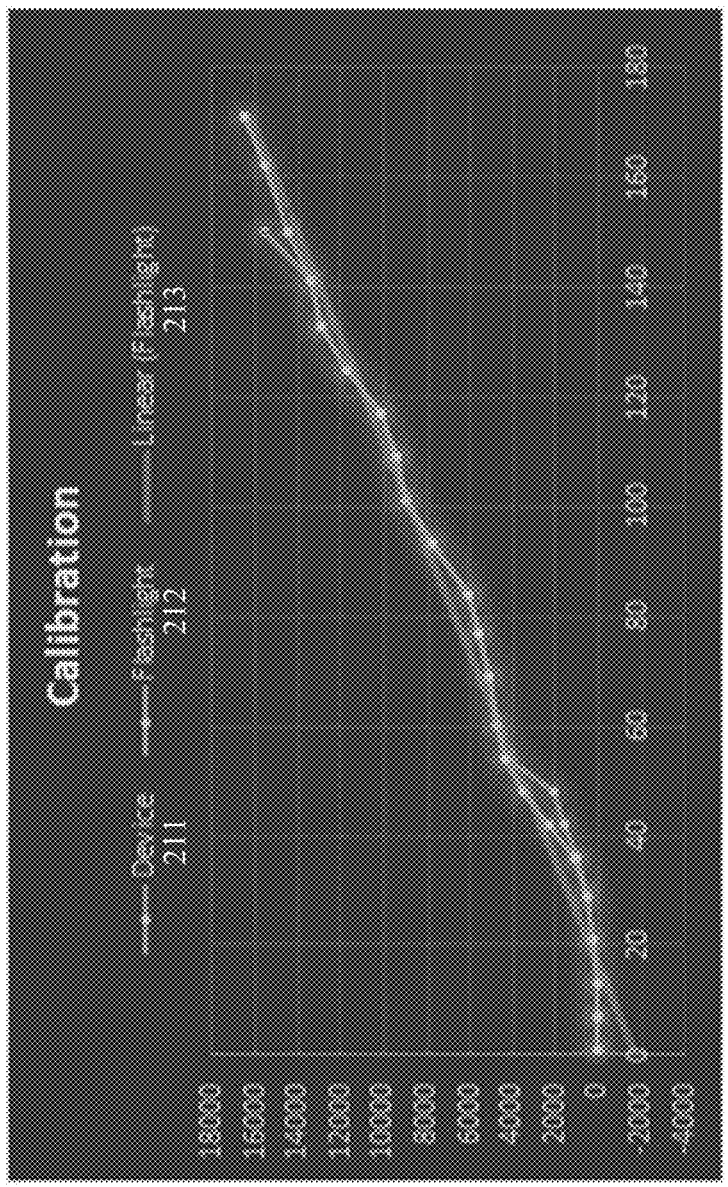
FIG. 2 is a light sensor calibration graph utilized to enable wake-up programming.

FIG. 2 is a light sensor calibration graph 200 utilized to enable wake-up programming 111. The light sensor calibration graph 200 depicts calibration data for calibrating hardware, such as a light sensor 107 of the luminaire 103A, for excess light reading to enable the wake-up protocol 120 of the wake-up programming 111. Light sensor 107, which can be an ambient light sensor, is calibrated for daylight control and energy saving operation. In the example, the light sensor 107 is an ambient light sensor that is dual purposed for both daylight and energy saving control and the wake-up protocol 120. The light range that the luminaire 103A detects via the light sensor 107 is controlled via an external resistor, which controls the voltage fed to an analog to digital (ADC) controller of the luminaire 103A. The gain calibration is done based on that light range using a linear equation (Y=MX+C) as shown in the light sensor calibration graph 200. This excess light is utilized for the wake-up programming 111 to work even in extreme light conditions, and the wake-up protocol 120 implemented by the wake-up programming 111 takes a current light level (light measurements 112A-N) as its reference at any given instance with a light threshold 113 for the wakeup sequence 300 (see FIG. 3) of the wake-up protocol 120 to work.

On the X axis of the light sensor calibration graph 200, is light intensity 205, shown in foot-candles; and, on the Y axis, is analog-to-digital (ADC) register data 210 used for calibration of the light sensor 107. As shown, to enable the wake-up protocol 120, the external resistor of the light sensor 107 is adjusted up from 150 foot-candles to 200 foot-candles of light intensity 205 (ambient light) with a corresponding increase in the ADC register data 210.

Line 211 shows the ADC register data 210 for the luminaire 103A to normally function without the wake-up protocol 120. As line 211 shows, during normal operation, the light sensor 107 of the luminaire 103A would detect up to 150 foot-candles without a wake-up light beam 102 from the wake-up light source 101 being imparted on the light sensor 107. Hence, 150 foot-candles is shown as the maximum light intensity 205 during calibration of 75,000 lumen output luminaires 103A-N installed closely together in the space 104. Lines 212 and 213 demonstrate that with the wake-up protocol 120, if the wake-up light source 101 is a flashlight, then calibration occurs by expanding the light intensity 205 detected by the light sensor 107. In particular, calibration expands the resistor range from 150 foot-candles to 200 foot-candles with a corresponding increase in ADC register data 210. Hence, even if the light sensor 107 of the luminaire 103A detects 150 foot-candles contributed from other luminaires 103B-N that are ON, the user can still flash a wake-up light beam 102 from the wake-up light source 101 (e.g., flashlight) to wake the luminaire 103A up.

Figure 3:
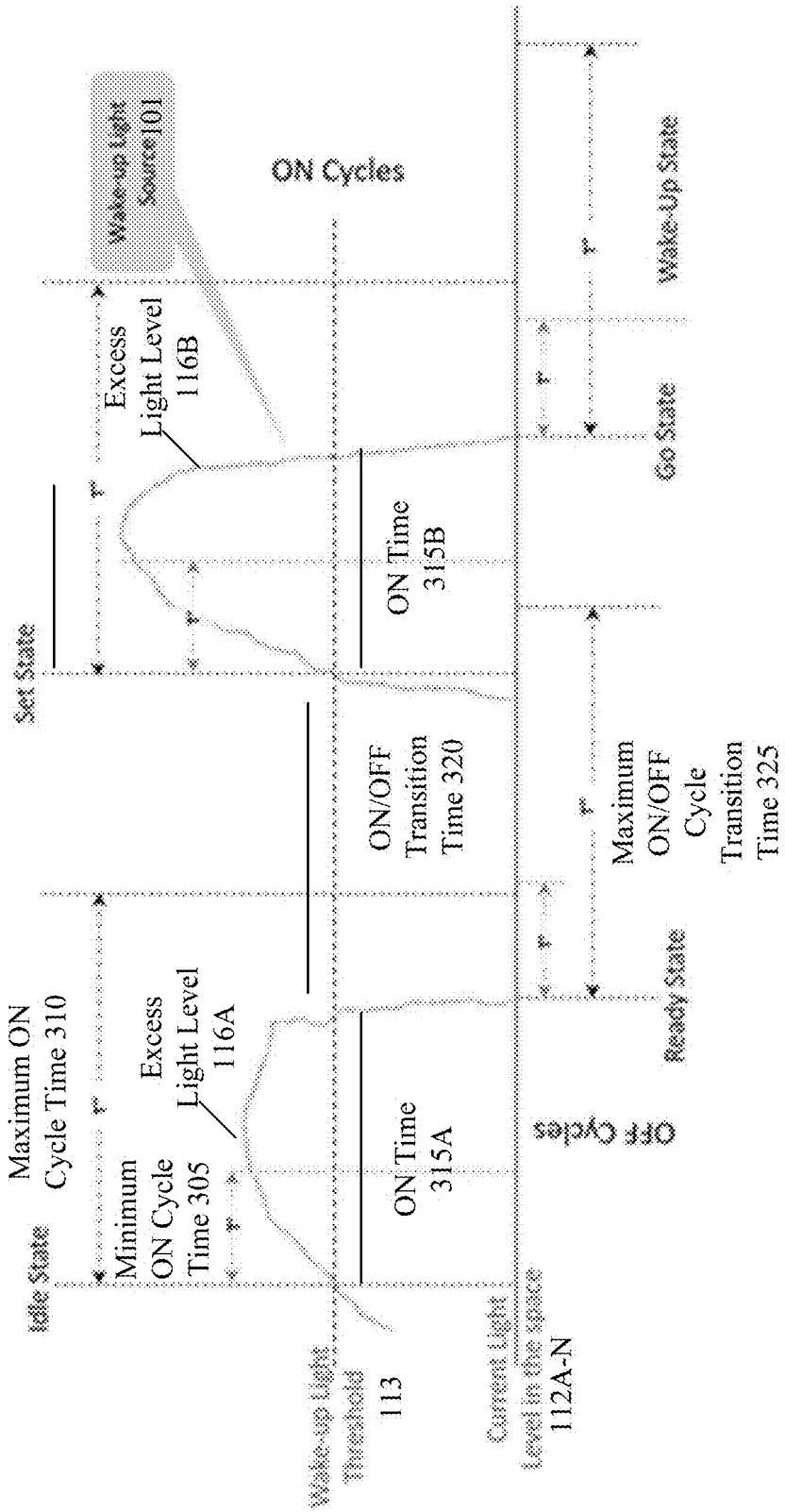
FIG. 3 is a wake-up sequence of the wake-up protocol that is implemented in the wake-up programming, shown in a state diagram format.

FIG. 3 is a wake-up sequence 300 of the wake-up protocol 120 that is implemented in the wake-up programming 111, shown in a state diagram format. During the wake-up sequence 300, a wake-up light source 101 is selectively pointed at a standalone wireless lighting device, such as luminaire 103A, for certain time periods to enable a beaconing mode 115. The wake-up sequence 300 includes flashing a wake-up light beam 102 to enable the wireless transceiver 108 to wirelessly beacon. The wake-up sequence 300 includes the following cycles: (1) ON cycle; (2) OFF cycle; (3) ON cycle; and (4) OFF cycle. Each ON/OFF cycle has a certain time limit (e.g., minimum ON cycle time 305)

to avoid accidental wake-up of the wireless transceiver 108 due to interference from external sources, such as light changes from moving clouds, etc.

Each stated ON/OFF cycle has a timeout with a minimum time T' (e.g., 2 seconds) and a maximum time T" (e.g., 6 seconds), shown as elements 305, 310, 325. In other words, the state must be acquired within (>T' and <T") time frame. Exceeding or not reaching the minimum time T' 305 and maximum ON/OFF cycle transition time T" 310, 325 on any of the given ON/OFF cycles resets the states back. Once reset, the user must restart the wake-up sequence 300 of the wake-up protocol 120 once again.

Current light levels 112A-N (also referred to interchangeably as light measurements) includes all light in the space 104 detected by the light sensor 107. For example, a first current light level 112A can include light from external sources in the space 104, such as sunlight and other luminaires 103B-N; and is used as a reference point for the wake-up light source 101. A second current light level 112B includes the wake-up light beam 102 emitted by the wake-up light source 101 in addition to the light from external sources in the space 104. Initially, in FIG. 2, only the background light is the first current light level 112A in the space 104, that is, without the wake-up light beam 102 so the wake-up sequence 300 is in the idle state. Subsequently, the second current light level 112B includes the wake-up light beam 102 and begins an ON cycle and transitions to the ready state provided certain conditions are satisfied.

Calibration of the wake-up protocol 120 is dynamic. Because the ambient light level is unknown, the light sensor 107 does not know how much of the ambient light is background light and how much is the wake-up light beam 102. The wake-up sequence 300 always tracks the current light level 112A-N in the space 103. For example, the first light level 112A in the space 104 is tracked and the wake-up sequence 300 is always stacking subsequent light levels 112B-N up all the time. Eventually, when the light sensor 107 detects brighter light (6-7 foot-candles higher) above the wake-up light threshold 113 as the second light level 112B for a certain time period, then the wake-up sequence 300 transitions into a ready state. Hence, the wake-up sequence 300 waits for a minimum ON cycle 305 and a maximum ON cycle time 310. If the minimum ON cycle time 305 (e.g., higher) and the maximum ON cycle time 310 (e.g., lower) are both satisfied, then the state transitions to the ready state is successful,—a first ON cycle of the wake-up sequence 300 is reached.

Next, in the wake-up sequence 300, a third current light level 112C returns to a normal background level (first OFF cycle) without the wake-up light beam 102 that is below the wake-up light threshold 113. Next, a fourth light level 112D has to transition to a higher level than the wake-up light threshold 113 for a second ON cycle to transition to the set state.

Wake-up sequence 300 is always comparing a newer light level 112D to a previous light level 112C. If a timeout (e.g., maximum ON cycle time 310 or minimum ON cycle time 305) expires, then the wake-up sequence 300 restarts. In the wake-up sequence 300 (a state machine of states), T' is a minimum timeout and T" is maximum timeout for both the ON cycle and OFF cycle. There are two sets—one per ON cycle and OFF cycle. The idle state is just implementing daylight and ambient light management. If during the idle state, all of a sudden, the light sensor 107 detects a wake-up light beam 102, the wake-up sequence 300 transitions to a ready state based on a 6 foot-candle (or higher) reading for greater than the minimum timeout 305 (T') and less than the maximum timeout 310 (T"). Once in the ready state of the wake-up sequence 300, the wake-up programming 111 waits for the OFF cycle, by waiting for the for minimum timeout 305 (T') and the maximum timeout 310 (T"). If the light sensor 107 is flashed again by the wake-up light beam 102, then the wake-up sequence 300 transitions to the set state (second flash). By the time the second flash is off, the wake-up sequence 300 transitions to the go state. The go state means the user flashed the wake-up beam 102 twice and off within the set time of an OFF cycle, and then the wireless transceiver 108 can enter into a state of the beaconing mode 115.

Wake-up sequence 300 includes the states described above (idle, ready, set, go, and wake-up) for sequence management. For example, if there is a cloud passing by and the luminaire 103A is near a window, that should not trigger the beaconing mode 115. The states of the wake-up protocol 120 with maximum and minimum timeouts 305, 310, 325 enable the wake-up protocol 120 to be user driven. In order to enable the beaconing mode 115, the user must use the wake-up light source 101 to progress sequentially through these states within the time frames; otherwise, the wake-up protocol 120 resets back to the idle state.

Any of the functionality of the wake-up protocol 120, including wake-up programming 111 and wireless control device programming 184, described herein for the lighting system elements (e.g., luminaires 103A-N and wireless control device 180) of the lighting system 100 can be embodied in one more applications or firmware as described previously. According to some embodiments, "function," "functions," "application," "applications," "instruction," "instructions," or "programming" are program(s) that execute functions defined in the programs. Various programming languages can be employed to create one or more of the applications, structured in a variety of manners, such as object-oriented programming languages (e.g., Objective-C, Java, or C++) or procedural programming languages (e.g., C or assembly language). In a specific example, a third-party application (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application can invoke API calls provided by the operating system to facilitate functionality described herein.

As used herein, a processor 110, 183 is a hardware circuit having elements structured and arranged to perform one or more processing functions, typically various data processing functions. Although discrete logic components could be used, the examples utilize components forming a programmable central processing unit (CPU). A processor 110, 183 for example includes or is part of one or more integrated circuit (IC) chips incorporating the electronic elements to perform the functions of the CPU.

The applicable processor 110, 183 executes programming or instructions to configure the luminaires 103A-B, wireless control device 180 etc. to perform various operations. For example, such operations may include various general operations (e.g., a clock function, recording and logging operational status and/or failure information) as well as various system-specific operations (e.g., daylighting and/or energy management) functions. Although a processor 110, 183 may be configured by use of hardwired logic, typical processors in lighting devices or in light responsive devices are general processing circuits configured by execution of programming, e.g., instructions and any associated setting data from the memories 109, 182 shown or from other included storage media and/or received from remote storage media.

Hence, a machine-readable medium may take many forms of tangible storage medium. Non-volatile storage media include, for example, optical or magnetic disks, such as any of the storage devices in any computer(s) or the like, such as may be used to implement the client device, media gateway, transcoder, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

Unless otherwise stated, any and all measurements, values, ratings, positions, magnitudes, sizes, angles, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as ±5% or as much as ±10% from the stated amount. The term "approximately" or "around" means that the parameter value or the like varies up to ±10% from the stated amount.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," "has," "having," "containing," "contain", "contains," "with," "formed of," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A lighting system, comprising:
    a wake-up light source to emit a wake-up light beam;
    a plurality of luminaires located in a space, wherein a respective luminaire comprises:
        an illumination light source to emit illumination lighting for the space;
        a light sensor to detect light;
        a wireless transceiver configured for wireless communication;
        a memory;
        a processor coupled to the light sensor, the wireless transceiver, and the memory; and
        wake-up programming in the memory, wherein execution of the wake-up programming by the processor causes the respective luminaire to:
            detect a plurality of light measurements above a light threshold, wherein detecting the plurality of light measurements above the light threshold comprises:
                measuring, via the light sensor, the plurality of light measurements; and
                based on the plurality of light measurements, identifying a sequence of excess light levels;
            determine whether the plurality of light measurements are in accordance with a pattern by:

comparing, the sequence of excess light levels with a wake-up sequence; and
determining that the comparison of the sequence of excess light levels satisfies the wake-up sequence by:
transitioning from an idle state to a ready state which is a first ON cycle based on a first flash from the wake-up light beam that satisfies a minimum ON cycle time and a maximum ON cycle time;
once in the ready state, waiting for a minimum timeout and a maximum timeout for a first OFF cycle;
upon the light sensor being flashed again by the wake-up light beam, transitioning to a set state that is a second ON cycle; and
upon the wake-up light beam being turned off in a second OFF cycle, transitioning to a go state, wherein the go state indicates the wake-up light beam flashed twice and off within a set time of the first and second OFF cycles; and
in response to determining the plurality of light measurements are in accordance with the pattern, enter a beaconing mode during the go state.

2. The lighting system of claim 1, wherein to enter the beaconing mode comprises:
enabling advertising of the wireless transceiver of the respective luminaire.

3. The lighting system of claim 1, wherein identifying the sequence of excess light levels comprises:
calibrating the sequence of excess light levels based on a previous ambient light level of background light in the space.

4. The lighting system of claim 3, wherein calibrating the sequence of excess light levels further comprises:
subtracting a contribution of the previous ambient light level to a respective light measurement to isolate a respective excess light level caused by the wake-up light beam from the background light in the space.

5. The lighting system of claim 1, wherein the wake-up light source includes a generic light source.

6. The lighting system of claim 1, wherein:
the wake-up light source includes a diffuse light source; and
the wake-up light beam includes incoherent light.

7. The lighting system of claim 6, wherein the diffuse light source is a smartphone flashlight.

8. The lighting system of claim 6, wherein:
the diffuse light source is a flashlight; and
the light sensor includes an ambient light sensor.

9. The lighting system of claim 1, wherein:
the wake-up light source includes a laser light source; and
the wake-up light beam includes coherent light.

10. The lighting system of claim 1, wherein the light sensor is dual purposed for both daylight and energy saving control and the wake-up programming.

11. The lighting system of claim 10, wherein the light sensor of the respective luminaire is gain calibrated to expand detected light intensity beyond a contribution of the illumination lighting emitted by other luminaires in the space that are ON.

12. A non-transitory machine-readable medium, comprising wake-up programming, wherein execution of the wake-up programming causes a luminaire to:
detect a plurality of light measurements above a light threshold, wherein detecting the plurality of light measurements above the light threshold comprises:
measuring, via the light sensor, the plurality of light measurements; and
based on the plurality of light measurements, identifying a sequence of excess light levels;
determine whether the plurality of light measurements are in accordance with a pattern by:
comparing, the sequence of excess light levels with a wake-up sequence; and
determining that the comparison of the sequence of excess light levels satisfies the wake-up sequence by:
transitioning from an idle state to a ready state which is a first ON cycle based on a first flash from the wake-up light beam that satisfies a minimum ON cycle time and a maximum ON cycle time;
once in the ready state, waiting for a minimum timeout and a maximum timeout for a first OFF cycle;
upon the light sensor being flashed again by the wake-up light beam, transitioning to a set state that is a second ON cycle; and
upon the wake-up light beam being turned off in a second OFF cycle, transitioning to a go state, wherein the go state indicates the wake-up light beam flashed twice and off within a set time of the first and second OFF cycles; and
in response to determining the plurality of light measurements are in accordance with the pattern, enter a beaconing mode, wherein to enter the beaconing mode includes to enable advertising of a wireless transceiver of the luminaire during the go state.

13. The non-transitory machine-readable medium of claim 12, wherein to identify the sequence of excess light levels includes to:
calibrate the sequence of excess light levels based on a previous ambient light level of background light in the space.

14. The non-transitory machine-readable medium of claim 13, wherein to calibrate the sequence of excess light levels further includes to:
subtract a contribution of the previous ambient light level to a respective light measurement to isolate a respective excess light level caused by the wake-up light beam from the background light in the space.

15. A luminaire, comprising:
an illumination light source to emit illumination lighting for the space;
a light sensor to detect light;
a wireless transceiver configured for wireless communication;
a memory;
a processor coupled to the light sensor, the wireless transceiver, and the memory; and
wake-up programming in the memory, wherein execution of the wake-up programming by the processor causes the luminaire to:
detect a plurality of light measurements above a light threshold, wherein detecting the plurality of light measurements above the light threshold comprises:
measuring, via the light sensor, the plurality of light measurements; and
based on the plurality of light measurements, identifying a sequence of excess light levels;
determine whether the plurality of light measurements are in accordance with a pattern by:

comparing, the sequence of excess light levels with a wake-up sequence; and determining that the comparison of the sequence of excess light levels satisfies the wake-up sequence by:

transitioning from an idle state to a ready state which is a first ON cycle based on a first flash from the wake-up light beam that satisfies a minimum ON cycle time and a maximum ON cycle time;

once in the ready state, waiting for a minimum timeout and a maximum timeout for a first OFF cycle;

upon the light sensor being flashed again by the wake-up light beam, transitioning to a set state that is a second ON cycle; and upon the wake-up light beam being turned off in a second OFF cycle, transitioning to a go state, wherein the go state indicates the wake-up light beam flashed twice and off within a set time of the first and second OFF cycles; and in response to determining the plurality of light measurements are in accordance with the pattern, enter a beaconing mode during the go state.

* * * * *